United States Patent
Smith

[11] 3,700,910
[45] Oct. 24, 1972

[54] BRAGG ANGLE OPTICAL MATCHED FILTER SYSTEM WITH CODED GLASS TRANSMISSION PLATE

[72] Inventor: Richard M. Smith, China Lake, Calif.

[73] Assignee: The United States of America as represented by the Secretary of the Navy

[22] Filed: July 23, 1970

[21] Appl. No.: 64,908

[52] U.S. Cl. .................250/225, 250/216, 235/181, 350/149
[51] Int. Cl. ................................................G02f 1/18
[58] Field of Search ........250/216, 226, 225; 356/71, 356/149; 350/150; 324/77 K; 235/181

[56] References Cited

UNITED STATES PATENTS

| | | |
|---|---|---|
| 3,189,746 | 6/1965 | Slobodin et al............250/216 |
| 3,220,003 | 11/1965 | Montague et al........324/77 K |
| 3,483,386 | 12/1969 | Jernigan....................250/216 |
| 3,424,512 | 1/1969 | Ingalls.......................356/71 X |
| 3,585,392 | 6/1971 | Korpel...................250/216 X |
| 3,435,244 | 3/1969 | Burckhardt et al. .....356/71 X |
| 3,365,579 | 1/1968 | Emshwiller............250/216 X |
| 3,395,960 | 8/1968 | Chang et al................350/150 |

OTHER PUBLICATIONS

Gerig et al: IEEE Proceedings; Vol. 52; No. 12; Dec. 1964; p. 1753.

Primary Examiner—Walter Stolwein
Attorney—R. S. Sciascia and Thomas O. Watson, Jr.

[57] ABSTRACT

The optical matched filter system provides a means of achieving pulse compression for pulse radar with an improved range resolution. The system separates zero and first order light at low frequencies (30–60MC region) by making use of the polarization properties of shear mode acoustic waves in quartz. Linear polarized collimated zero order light from a laser illuminates an acoustic modulator. An electrical signal is converted by transducers into an acoustic shear wave signal which is propagated through the acoustic modulator and modulates the laser light beam to generate first order light containing a coded phase front polarized orthogonal to the zero order light from the laser containing a plane phase front. When the first order coded phase front and a coded glass transmission plate are matched at the moment of correlation a first order plane phase front is produced. An analyzer blocks most of the zero order light to reduce the bias on a photomultiplier. The first order plane phase front is focused to a spot by a transform lens and the light is passed through an optimized aperture or slit to the photomultiplier where the optical output is converted to an electrical output.

9 Claims, 1 Drawing Figure

PATENTED OCT 24 1972
3,700,910
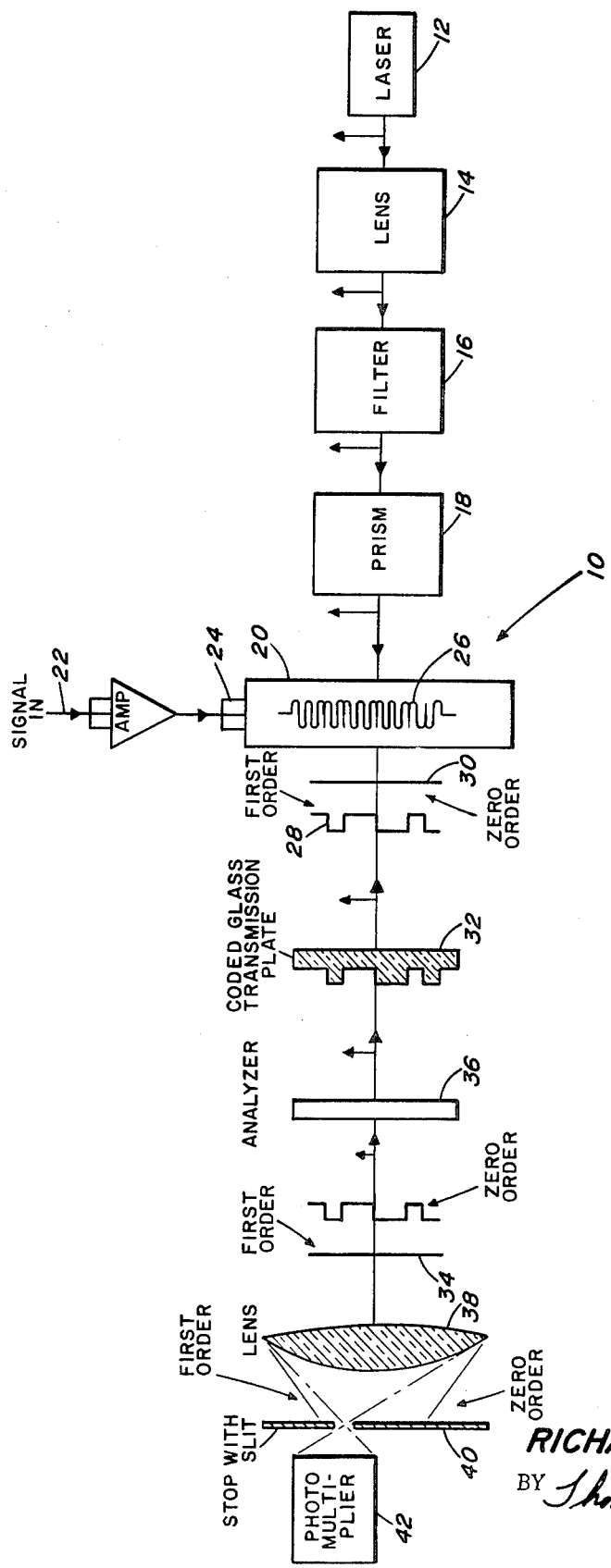
INVENTOR.
RICHARD M. SMITH
BY Thomas O. Watson Jr.
ATTORNEY

3,700,910

BRAGG ANGLE OPTICAL MATCHED FILTER SYSTEM WITH CODED GLASS TRANSMISSION PLATE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to improvements in pulse radar, and more particularly it pertains to a new and improved Bragg Angle optical matched filter with a coded glass transmission plate.

A filter is considered to be a matched filter if the impulse function $h(t)$ of the filter is the time inverse of the signal $f(t)$. That is, if $h(t)=f(-t)$. The matched filter, which is designed for a specific signal, is not designed to give an output that faithfully reproduces the input signal. The matched filter, however, optimizes detection, providing the best peak signal-to-noise ratio.

In the field of optical matched filters, it has been the general practice to employ electrical delay lines for achieving pulse compression, using biphase pulse coding, which is expensive and is subject to drift with changes in temperature. Also such devices have been unsatisfactory in that they are bulky and inconvenient. Recently other optical matched filters have been used, but they have several disadvantages. If the matched filters are to operate at a desirable low frequency (30–60MC region) the required system is complex or uses expensive optics. Although some simpler matched filters have been developed they do not operate in the 30–60MC region.

The nature of optical materials currently being used in Bragg Angle matched filters used at high frequencies is such that the zero order and first order frequency components can be easily separated. However, at lower frequencies there is smaller angular separation between the zero and first orders and the high frequency techniques are not as useful.

Also, the zero order creates an undesired bias on the light detector. Complicated schemes utilizing lenses and stops have been used to reduce or eliminate the zero order at lower frequencies.

OBJECTS OF THE INVENTION

Accordingly, it is an object of the present invention to separate zero and first order light at low frequencies.

Another object is to provide an optical matched filter system which is simpler, requires less space and is cheaper to manufacture.

A further object of the invention is to increase the range when the filter is used in a peak-power-limited radar using a phase-coded pulse instead of a convention rectangular pulse.

Still another object is to optimize detection and to increase the signal-to-noise ratio of a signal.

A still further object is to provide a simple in-line system compared to the more complex folded system where a coded mirror is used.

Other objects, advantages and novel features of the invention will become apparent from the following detailed description of the invention when considered in conjunction with the accompanying drawings.

SUMMARY OF THE INVENTION

The general purpose of this invention is to improve and extend radar range performance through pulse coding. To accomplish this the Bragg Angle optical matched filter system of the present invention was developed having a pulse compression of 100:1 (10 microsecond pulse compressed to 0.1 microsecond pulse) when a binary phase coded electrical pulse is put into the system. Pulse compression allows a wider pulse and, thus, more energy can be transmitted for a given range resolution which results in an increase in the signal-to-noise ratio. The matched filter of the present invention replaces the detector in a radar system and can be tailored to provide radar target parameters by optimizing the signal form.

BRIEF DESCRIPTION OF THE DRAWING

The drawing is a schematic, partially in block diagram form, of a preferred embodiment of the present invention.

DESCRIPTION OF THE PREFERRED EMBODIMENT

The drawing, which illustrates a preferred embodiment of the present invention, shows the optical matched filter system 10 and its various components now to be described.

The light source used in this system is a Spectra-Physics model 124 helium-neon gas laser 12 which produces a 1.1MM diameter zero order light beam at a wave length of 6328 A. A collimating lens 14 is used with a spatial filter 16 to produce a spatial filtered collimated beam from the output of laser 12. Spatial filtering is accomplished by focusing of the beam through an exit aperture of laser 12 which is close to the diffraction-limited spot size for the focusing lens. Collimation of the filtered light is accomplished by placing the focused spot at the focal point of the collimating lens 14. Beam expansion is dependent on the ratio of the equivalent focal lengths of the two lens systems used in the collimating lens 14 and the spatial filter 16. For the values used, the input laser beam of diameter 1.1MM is expanded to 12.1MM. The laser beam is expanded for more efficient use of the prism expanding beam optics to be described.

A beam spreading prism system 18 is used to spread out the laser light beam in one dimension so that it can interact over the entire length of an acoustic signal in the ultrasonic light modulator 20 to be described (approximately 1.5 inches). The laser beam which impinges the prism system 18 is spread to about 30 times the original width. The beam is spread so that the flatter portion of the intensity profile illuminates a coded signal in the ultrasonic or acoustic modulator 20. The output beam width is limited by a stop (not shown) to correspond to the signal length in the modulator 20. The prisms are 8MM thick. On one side they have an anti-reflection coating for an angle of incidence of 80° from the normal. Reflection is less than 1% for light polarized parallel to the plane of incidence. The exit side of the prisms have an anti-reflection coating for normal incidence. A $\lambda/2$ wave plate attached to the collimating lens 14 is used to rotate the polarization of light for minimum reflection.

The fused silica acoustic or ultrasonic light modulator and amplifier 20 shown in the drawing operates in the shear mode producing first order light polarized orthogonal to the zero order light from the laser 12 in either a Debye-Sears or Bragg diffraction mode. An electrical phase coded pulse 22 is converted by appropriate transducers 24 into an acoustic shear wave signal 26 which is propagated through the acoustic modulator 20 and modulates the laser light beam. The acoustic beam is either oriented perpendicular or at the Bragg angle to interact with the light beam to produce beam directions related to the angular frequencies of the light and acoustic waves. The acoustic energy generates first order light containing a coded phase front 28 polarized orthogonal to the zero order light which contains a plane phase front 30. The type of diffraction mode is dependent on the orientation of the modulator 20 to the laser light beam and on the frequency of the acoustical signal 26.

A binary coded transmission phase plate 32 is constructed using the glass on glass method. The plate 32 may be provided with several codes which can be selected by moving the coded phase plate 32 relative to the light beam to match the code placed on the light beam by the acoustic modulator 20. If the two are matched when the light beam or first order coded phase front impinges on the coded transmission plate, a first order plane phase front 34 emerges having maximum light.

An analyzer 36 is used in the system to block most of the zero order light and thus reduce the bias on a photomultiplier 42. The analyzer is a polarized absorption type with unknown flatness. The amount that linear polarized light beam is attenuated depends on the orientation of the analyzer 36 to the light beam. When oriented properly the analyzer 36 discriminates between the first order optical signal 28 and the orthogonally polarized zero order signal 30. It discriminates between the two polarizations and attenuates the undesired zero order signal 30.

Aside from the collimating lens system 14, the only lens system used in this matched filter is the transforming lens 38 used to provide the transform of a spatial signal. The first order plane phase front 34 is focused to a spot by the transform lens 38.

A stop with a photomultiplier slit 40 is also used in the in-line system of the present invention and has a variable width slit which is generated through photographic reduction, resulting in a negative on a high resolution Kodak plate. The glass plate is then cut to fit into a cartridge. Cartridges with different slit designs can be easily fitted to the face of a photomultiplier 42. This makes possible easy introduction of different slits into the optical system. The light from the transform lens 38 is passed through slit 40 to the photomultiplier 42.

The ten-stage head-on type RCA photomultiplier and amplifier 42 converts the system's optical output to an electrical output. The photomultiplier's output signal is then fed into a high impedance unity gain Textronics probe (not shown). The probe converts the high impedance signal into a signal matched to a 50 ohm line without loss of gain. This enables the signal to be handled in a 50 ohm system.

Whether the ultrasonic light modulator 20 operates in the Debye-Sears or Bragg mode depends on the parameters of the transducer 24 and the frequency range of the acoustic signals 26. The acoustic modulator 20 used in this system can operate in either mode. The acoustic waves are of the shear type. As used in the optical system of the present invention, the linearly polarized incident light is oriented to produce first-order polarized light rotated 90° from the incident.

Obviously many other modifications and variations of the present invention are possible. For example, a binary phase coded mirror could be used instead of the phase coded transmission plate 32. Also, an optical code generator could be used instead of the electrical code generator to provide for an overall more simplified system.

Obviously many modifications and variations of the present invention are possible in the light of the above teachings.

What is claimed is:

1. An optical matched filter system comprising:
    a source of linear polarized collimated zero order light having a frequency in the range of 30–60 mc.;
    a first means for generating a first order coded phase front polarized orthogonal to said zero order light when said zero order light impinges on said first means;
    a coded glass transmission plate means for producing a first order plane phase front from said first order coded front;
    polarized absorption type analyzer means to substantially block the passage of said zero order light, and;
    a transform lens means to focus only said first order plane phase front through an aperture and onto a photomultiplier.

2. An optical matched filter system as recited in claim 6, wherein said first means is comprised of an ultrasonic light modulator means for producing an acoustic shear wave signal.

3. An optical matched filter system as recited in claim 2, wherein said ultrasonic light modulator means comprises a transducer to produce an acoustic shear wave signal which is propogated through fused silica.

4. An optical matched filter system as recited in claim 3 wherein a beam spreading prism means spreads out said zero order light in one dimension so it can interact over the entire length of said ultrasonic light modulator means.

5. An optical matched filter system as recited in claim 4, wherein a collimating lens is used with a spatial filter to produce said collimated zero order light.

6. An optical matched filter system for use in a pulse radar system comprising:
    first means for generating a linear polarized collimated zero order light having a frequency in the range of 30–60 mc. along a longitudinal axis;
    second means situated along said axis to spread said zero order light in one dimension;
    third means situated along said axis for intercepting said zero order light and generating a first order coded phase front polarized orthogonal to said zero order light;
    fourth means to produce a first order plane phase front from said first order coded phase front;

fifth means to remove substantially all of said zero order light from said first order plane phase front; and, sixth means to focus said first order plane phase front through an aperture and onto a photomultiplier.

7. The matched filter system of claim 6 wherein said third means comprises:

a shear mode ultrasonic modulator.

8. The matched filter system of claim 7 wherein said fifth means comprises:

a polarized absorption type analyzer.

9. The matched filter system of claim 8 wherein said fourth means comprises a coded glass transmission plate.

* * * * *